United States Patent Office 2,780,619
Patented Feb. 5, 1957

2,780,619
METALLIZABLE DISAZO DYESTUFFS

Rudolf Dürig, Basel, and Ernst Keller, Binningen, Switzerland, assignors to J. R. Geigy A. G., Basel, Switzerland, a Swiss firm No Drawing. Application September 13, 1954,
Serial No. 455,746

6 Claims. (Cl. 260—153)

The present invention concerns the production of metallisable disazo dyestuffs which are distinguished by their good drawing power on to cellulose fibres as well as by the good fastness to washing and light and the pure shade of the coppered cellulose dyeings. It is also concerned with the production of pure coppered cellulose dyeings and of cellulose material which is fast dyed with the help of the new disazo dyestuffs.

It has been found that valuable diazo dyestuffs are obtained if an aminomonoazo dyestuff of the general Formula I

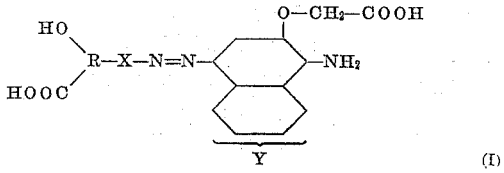

is diazotised and coupled in an alkaline medium with an azo component of the general Formula II

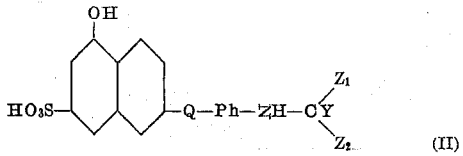

In these formulae: R represents a benzene radical which contains the hydroxyl and the carboxyl group in the o-positions, X represents the direct simple linkage or a bridging member of the formula —CO—Ph—, —NH—CO—Ph—, Y represents hydrogen or the sulphonic acid group, Q represents a bridging member of the formula —NH—, —NH—CO—, —NH—CO—NH—,

Ph represents an m- or p-phenylene radical which can be further substituted, Cy represents a 1.3.5-triaszinyl radical, Z₁ represents an organically substituted amine radical, and Z₂ represents a halogen atom, a hydroxyl group and advantageously if desired an organically substituted amine radical.

If desired, all the benzene rings in these formulae can be further substituted with substituents usual in azo dyestuffs, e. g. with halogen, alkyl, alkoxy, carboxyl and sulphonic acid groups.

The aminomonoazo dyestuffs usable according to the present invention are obtained from amino-2-hydroxybenzene-1-carboxylic acids, e. g. from 5- or 3-amino-2-hydroxybenzene-1-carboxylic acid, 5- (or 3-) amino-2-hydroxybenzene-1-carboxylic-3- (or -5-) sulphonic acid, 5-amino-3-chloro- or -3-methyl-2-hydroxybenzene-1-carboxylic acid, by diazotising and coupling with 1-amino-2-carboxy-methoxy-naphthalene. If desired, the 1-amino-2-carboxy-methoxy-naphthalene can be sulphonated in the 6- or 7-position. Instead of the amino-2-hydroxybenzene-1-carboxylic acids which are preferred, also aminobenzoyl derivatives of 2-hydroxybenzene carboxylic acids or of amino-2-hydroxybenzene carboxylic acids can be used, in which case the amino group should be in the m- or p-position with regard to the bridging member, to the o-hydroxybenzene carboxylic acid radical. The following compounds for example can be used: 3'- or 4'-amino-4-hydroxybenzophenone-3-carboxylic acid, 3'- or 4'-amino-3-methyl-4-hydroxybenzophenone-3-carboxylic acid, 3'-amino-4'-methyl-4-hydroxybenzophenone-3-carboxylic acid, also 3- or 4-aminobenzoyl, 3-amino-4-methyl-benzoyl, 3-amino-4-chlorobenzoyl, 3-amino-4-methoxybenzoyl derivatives of the amino-2-hydroxybenzene-1-carboxylic acids listed above, and also 3- or 5-(3'-aminobenzoylamino)-2-hydroxybenzene-1-carboxylic acid-4'-sulphonic acids. The coupling with the 1-amino-2-carboxy-methoxy-naphthalene or its 6- or 7-sulphonic acids is performed in an acid medium and the diazotisation of the monoazo dyestuff is performed according to the usual indirect method with sodium nitrite and mineral acid in the cold. It is of advantage to choose the components of the monoazo dyestuff so that it contains a sulphonic acid group.

Starting material for the coupling components of the general Formula II usable according to the present invention are those derivatives of 2-amino-5-hydroxynaphthalene-7-sulphonic acid which contain an m- or p-aminophenyl radical bound either direct to the amino group or, if desired, bound by way of bridging members which can also form parts of an azole ring which is fused to the naphthalene ring. Such derivatives are for example: 2 - (4' - aminophenylamino) - 5 - hydroxynaphthalene-7-sulphonic acid, 2-(4'- amino - 3'- carboxyphenylamino)-5-hydroxynaphthalene-7-sulphonic acid, 2-(3'- or 4'-aminobenzoylamino) - 5 - hydroxynaphthalene - 7 - sulphonic acid, 2-(4'-chloro- or -methyl-3'-aminobenzoylamino)-5-hydroxynaphthalene-7-sulphonic acid, 2-(4'-aminophenyl - ureido) - 5 - hydroxynaphthalene - 7 - sulphonic acid, 2 - (3'- or .4'- aminophenyl) - 5''- hydroxy-4.5:1''.2''-naphthothiazole-7''-sulphonic acid. By reacting the alkali salts of these compounds in aqueous solution with finely distributed cyanuric chloride in the cold according to methods known per se and by the gradual replacement at a raised temperature of a further halogen atom of the condensation product by an organic amine and preferably, of both halogen atoms by amines of the benzene series, the coupling components which can be used according to the present invention are obtained.

The diazotised monoazo dyestuff is coupled with the end components of the general Formula II in an alkaline medium, if desired with the addition of agents which facilitate the coupling such as pyridine or alkanolamine bases.

In the form of their alkali salts, the diazo dyestuffs according to the present application are dark powders which dissolve in hot water with a pure blue to greenish-blue shade. They draw very well on to cellulose fibres from a bath containing Glaubers salt. The cellulose dyeings which are also pure blue to greenish-blue in shade only slightly change their shade on the action of copper salts. The disazo dyestuffs according to the present application are fixed very fast to light and washing by the after-coppering process.

The direct cellulose dyeings can be coppered either in the dyebath or in a fresh bath with the usual copper salts, e. g. copper sulphate or copper acetate. The copper salts should be in neutral to weakly acid aqueous solution. If desired, copper compounds can also be used which are stable to alkalies such as for example are obtained by reacting copper sulphate with sodium tartrate in a soda alkaline medium.

The following examples illustrate the invention with-

Example 1

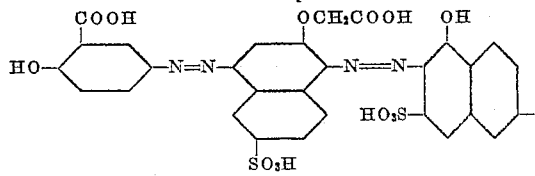 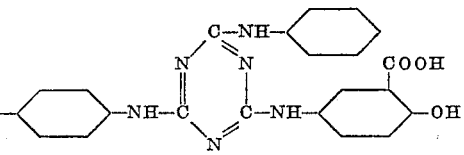

46.1 parts of the aminoazo dyestuff from diazotised 5-amino-2-hydroxybenzene-1-carboxylic acid and 1-amino-2-carboxy-methoxynaphthalene-6-sulphonic acid are dissolved at 15° in 1500 parts of water in the presence of a little sodium carbonate. A solution of 7.6 parts of sodium nitrite in 20 parts of water is then added and the whole is poured into 42 parts of 30% hydrochloric acid and 80 parts of water at 15°. After stirring for several hours the light brown diazo compound is formed, whereupon it is cooled with ice to 0–5°.

In the meantime, 65.1 parts of the condensation product produced in the usual manner from 1 mol of cyanuric chloride, 1 mol of 2-(4'-aminophenyl)-amino-5-hydroxynaphthalene-7-sulphonic acid, 1 mol of 5-amino-2-hydroxybenzene-1-carboxylic acid and 1 mol of aminobenzene and 45 parts of sodium carbonate are dissolved in 1000 parts of water. The solution is cooled to 0–5° and stirred with 300 parts by volume of pyridine. The suspension of the diazo compound is poured in at this temperature. The coupling is complete in a short time. The disazo dyestuff obtained in this way, when dry, is a dark powder which dissolves in water with a greenish-blue shade. It dyes cotton and regenerated cellulose in clear, greenish-blue shades. On after-treating with copper salts a dyeing which is only slightly different in colour is obtained which has very good fastness to washing and light.

If in the above example a cyanuric condensation product is used as azo component which, instead of being produced from 1 mol of 5-amino-2-hydroxybenzene-1-carboxylic acid with 1 mol of another amine, is produced for example from aminobenzene, 3-aminobenzene-1-carboxylic acid, 4-aminobenzene-1-sulphonic acid or 4-aminobenzene-1-sulphonamide or 1 mol of an aliphatic amine such as, e. g. diethylamine, ethylene diamine or dioxethylamine, then disazo dyestuffs are obtained which also dye cellulose material in clear greenish-blue shades and have the same good properties.

If in the aminoazo dyestuff, the 1-amino-2-carboxy-methoxynaphthalene-6-sulphonic acid is replaced by 1-amino-2-carboxy-methoxynaphthalene - 7 - sulphonic acid and otherwise the same procedure is followed, then disazo dyestuffs with similar properties are obtained.

Example 2

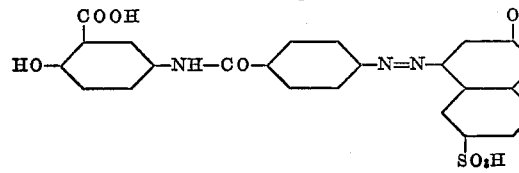 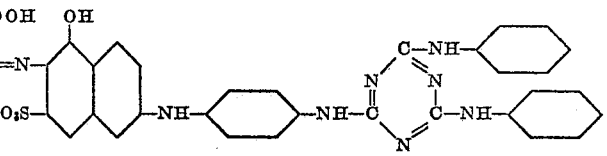

58 parts of the aminoazo dyestuff from diazotised 5-(4'-aminobenzoyl)-amino-2-hydroxybenzene-1-carboxylic acid and 1-amino-2-carboxymethoxynaphthalene-6-sulphonic acid are diazotised in the same manner as is described in Example 1 and coupled in the presence of pyridine with 59.1 parts of the ternary condensation product from 1 mol of cyanuric chloride, 1 mol of 2-(4'-aminophenyl)-amino-2-hydroxynaphthalene - 7 - sulphonic acid and 2 mol of aminobenzene. The isolated disazo dyestuff dyes cotton and staple fibre in strong blue shades which, on being treated afterwards with copper salts, have very good fastness to washing and light.

If in this example, the 5-(4'-aminobenzoyl)-amino-2-hydroxybenzene-1-carboxylic acid in the aminoazo dyestuff is replaced by 5-(3'-aminobenzoyl)-amino-2-hydroxybenzene-1-carboxylic acid, by 5-(4'-amino-3'-methylbenzoyl)-amino-2-hydroxybenzene-1-carboxylic acid or by 5-(4'-amino-4'-methylbenzoyl)-amino-2-hydroxybenzene-1-carboxylic acid and otherwise the same procedure is followed, then disazo dyestuffs are obtained the after-coppered cellulose dyeings of which have a similar shade and corresponding fastness properties.

If instead of 2 mols of aminobenzene a cyanuric derivative obtained from the reaction of 1 mol of 5-amino-2-hydroxybenzene-1-carboxylic acid and 1 mol of aminobenzene is used and otherwise the same procedure is followed, disazo dyestuffs with similar properties are obtained.

Example 3

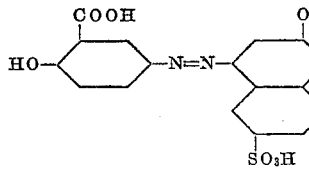

The aminoazo dyestuff from diazotised 5-amino-2-hydroxybenzene-1-carboxylic acid and 1-amino-2-carboxymethoxynaphthalene-6-sulphonic acid is diazotised as described in Example 1 and in the presence of pyridine coupled with 78.9 parts of the ternary condensation product from 1 mol of cyanuric chloride, 1 mol of 2-(3'-aminobenzoyl) - amino-5-hydroxynaphthalene-7-sulphonic acid and 2 mols of 3-aminobenzene-1-sulphonic acid. A disazo dyestuff is obtained which dyes cellulose fibres a pure blue shade. The fastness to washing and light is considerably increased by after-treatment with solutions of copper salts.

Similar disazo dyestuffs which also dye cellulose material in strong blue shades are obtained if a cyanuric condensation product is used in which the 2-(3'-aminobenzoyl)-amino-5-hydroxynaphthalene-7-sulphonic acid is replaced by 2-(4'-aminobenzoyl)-amino-5-hydroxynaphthalene-7-sulphonic acid or 2-(4'-aminophenylcarbamyl)-amino-5-hydroxynaphthalene-7-sulphonic acid or the 3-aminobenzene 1-sulphonic acid is replaced by aminobenzene. In this case also the wet and light fastness proper-

Example 4

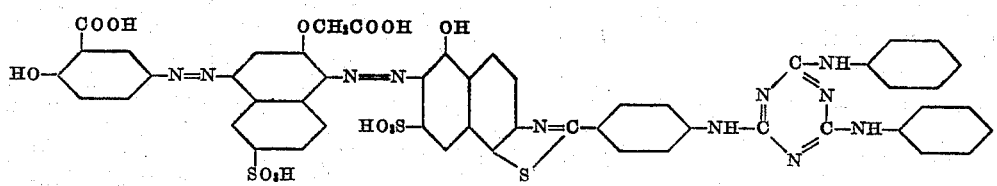

46.1 parts of the aminoazo dyestuff from diazotised 5-amino-2-hydroxybenzene-1-carboxylic acid and 1-amino-2-carboxymethoxynaphthalene-6-sulphonic acid are diazotised as described in Example 1 and in the presence of pyridine are coupled with 63.3 parts of the ternary condensation product from 1 mol of cyanuric chloride, 1 mol of 2-(3'-aminophenyl)-5"-hydroxy-4.5:1".2"-naphthothiazole-7"-sulphonic acid and 2 mols of aminobenzene to form the disazo dyestuff. This dyestuff dyes cotton and regenerated staple fibre in strong blue shades which on after-treatment with copper salts have very good fastness to washing and light.

If in this example instead of the 2-(3'-aminophenyl)-5"-hydroxy-4.5:1".2"-naphthothiazole-7"-sulphonic acid in the cyanuric condensation product, 2-(4'-aminophenyl-carbamyl)-amino-5-hydroxynaphthalene-7-sulphonic acid is used, or if 3-aminobenzene-1-carboxylic acid is used instead of aminobenzene, then disazo dyestuffs are obtained which, on after-treatment with copper salts, produce cellulose dyeings with similar good properties.

Example 5

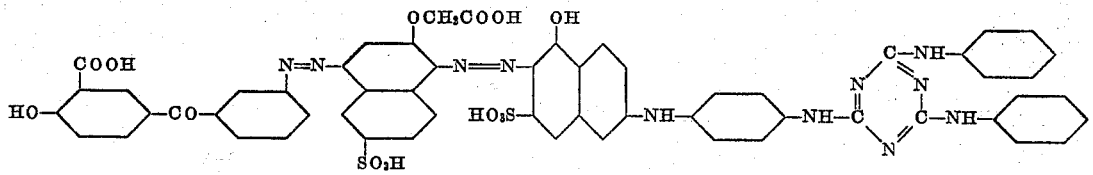

54.1 parts of aminoazo dyestuff from diazotised 5-amino-3-sulpho-2-hydroxybenzene-1-carboxylic acid and 1-amino-2-carboxymethoxynaphthalene-6-sulphonic acid are coupled in the presence of pyridine as described in Example 1 with 59.1 parts of the ternary condensation product from 1 mol of cyanuric chloride, 1 mol of 2-(4'-aminophenyl)-amino-5-hydroxynaphthalene-7-sulphonic acid and 2 mols of aminobenzene. A disazo dyestuff is obtained which dyes cellulose fibres a clear blue shade. The fastness to washing and light is considerably increased by after-treatment with copper sulphate solutions.

If the 5-amino-3-sulpho-2-hydroxybenzene-1-carboxylic acid is replaced by 5-sulpho-3-amino-2-hydroxybenzene-1-carboxylic acid or if 1-amino-2-carboxymethoxynaphthalene-7-sulphonic acid or 1-amino-2-carboxymethoxynaphthalene is used instead of 1-amino-2-carboxymethoxynaphthalene-6-sulphonic acid, disazo dyestuffs are obtained which also dye cellulose material in clear greenish-blue shades. The dyeings have similarly good properties.

Example 6

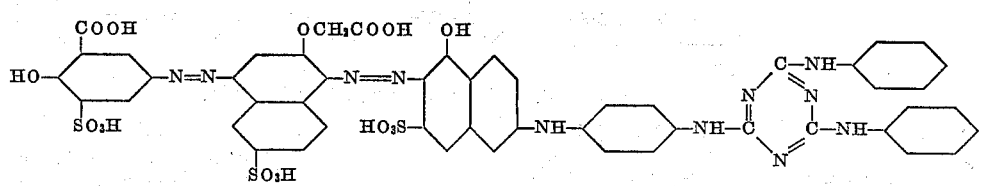

56.5 parts of the aminoazo dyestuff from diazotised 3'-amino-4-hydroxybenzophenone-3-carboxylic acid and 1-amino-2-carboxymethoxynaphthalene-6-sulphonic acid are diazotised as described in Example 1 and coupled in the presence of pyridine with 59.1 parts of the ternary condensation product from 1 mol of cyanuric chloride, 1 mol of 2-(4'-aminophenyl)-amino-5-hydroxynaphthalene-7-sulphonic acid and 2 mols of aminobenzene. The isolated disazo dyestuff dyes cotton and staple fibre in strong blue shades which, when after-treated with copper salts, have very good fastness to washing and light.

Similar disazo dyestuffs which dye cellulose material in clear blue shades are obtained if the 3'-amino-4-hydroxy-benzophenone-3-carboxylic acid is replaced by 4'-amino-4-hydroxybenzophenone-3-carboxylic acid or by 4'-amino - 3' - methyl - 4 - hydroxybenzophenone - 3 - carboxylic acid. In this case too the fastness to light and washing is considerably improved by copper after-treatment.

Example 7

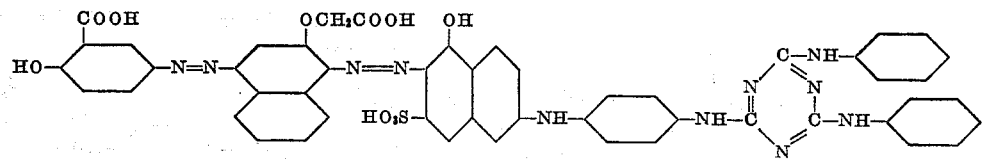

38.1 parts of the aminoazo dyestuff from diazotised 5-amino-2-hydroxybenzene-1-carboxylic acid and 1-amino-2-carboxymethoxynaphthalene are diazotised as described in Example 1 and coupled in the presence of pyridine with 59.1 parts of the ternary condensation product from 1 mol of cyanuric chloride, 1 mol of 2-(4'-aminophenyl)-amino-5-hydroxynaphthalene-7-sulphonic acid and 2 mols of aminobenzene. This dyestuff dyes cellulose material in strong blue shades which, when after-treated with copper salts, have very good fastness to light and washing.

If instead of 2 mols of aminobenzene in the cyanuric condensation product 2 mols of diethylamine or 2 mols of diethanolamine or 1 mol of 3-aminobenzene-1-carboxylic acid and 1 mol of monoethanolamine or 1 mol of ethylene diamine, are used then disazo dyestuffs are obtained which produce cellulose dyeings with similar good properties when after-treated with copper salts.

*Example 8*

2 parts of the dyestuff obtained accordin gto Example 1 are dissolved in a dyebath containing 3000 parts of water and 1 part of soda. 100 parts of cotton are entered at 40–45°, the bath is brought to 90–95° within 30 minutes, 30 parts of sodium sulphate are added and dyeing is performed at this temperature for 45 minutes. At the end of this time, the dyed goods are rinsed cold in the usual way and after-treated in a fresh bath at 70° for 30 minutes containing 2 parts of copper sulphate and 2 parts of acetic acid. The goods are then rinsed cold and dried. In this way, the cotton is dyed in clear, greenish-blue shades which have very good wet and light fastness properties.

What we claim is:

1. A disazo dyestuff having the general formula:

wherein A represents an aromatic radical of the benzene series containing the hydroxyl and carboxyl group in o-position to each other, X represents a bridging member selected from the group consisting of —NH—CO— and —CO—, and linked to nucleus I in other than the o-position, W represents a member selected from the group consisting of H and methyl, $n$ is an integer from 0–1 inclusive, one Y represents hydrogen and the other Y represents a member selected from the group consisting of hydrogen and the sulphonic acid group, Q represents a bridging member selected from the group consisting of —NH—, —NH—CO—, —NH—CO—NH— and

and linked to nucleus II in other than the o-position, and $Z_1$ and $Z_2$ represent a member selected from the group consisting of lower alkylamino and monocyclic arylamino radicals.

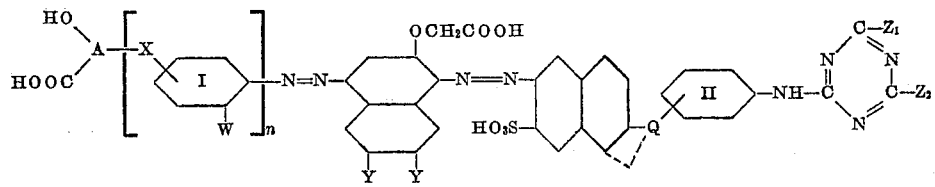

2. A disazo dyestuff of the formula:

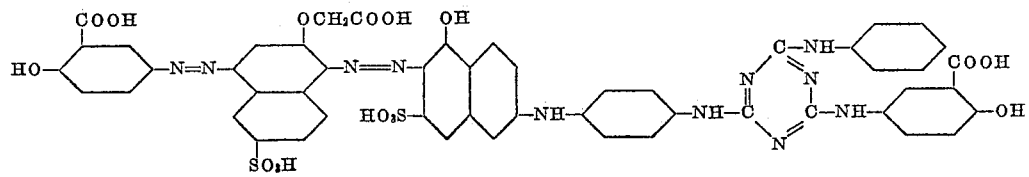

3. A disazo dyestuff of the formula:

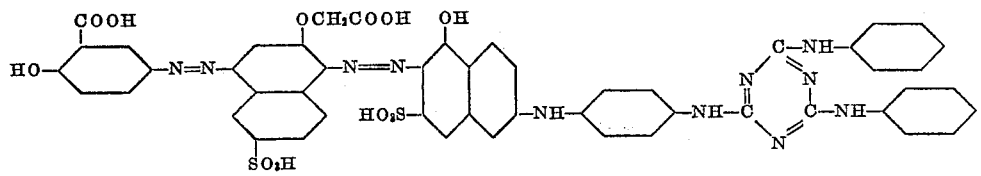

4. A disazo dyestuff of the formula:

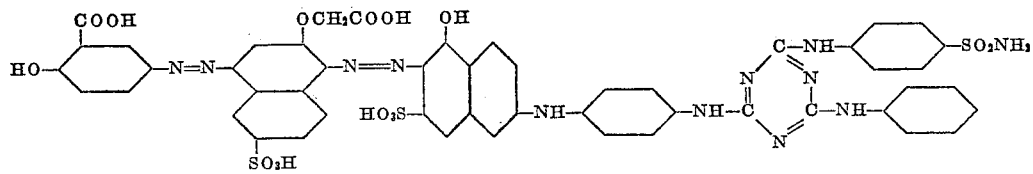

5. A disazo dyestuff of the formula:

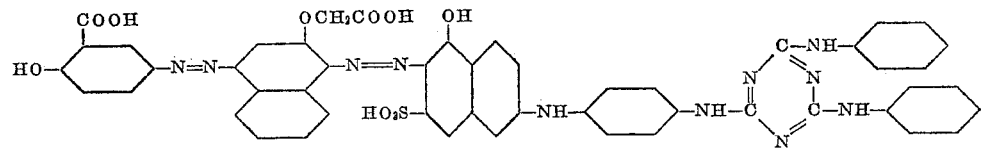

6. A disazo dyestuff of the formula:

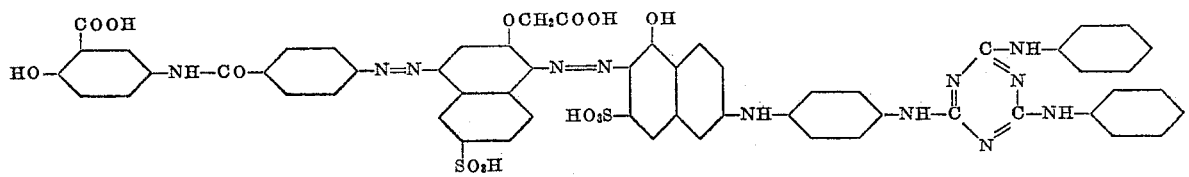

References Cited in the file of this patent
UNITED STATES PATENTS
2,268,919      Anderau _____ Jan. 6, 1942